United States Patent
Moriya et al.

(10) Patent No.: US 8,554,453 B2
(45) Date of Patent: Oct. 8, 2013

(54) DEVICE AND METHOD FOR CONTROLLING STARTER, AND VEHICLE

(75) Inventors: Kouki Moriya, Aichi-ken (JP); Jumpei Kakehi, Toyota (JP); Hasrul Sany Bin Hashim, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/514,477

(22) PCT Filed: Apr. 8, 2011

(86) PCT No.: PCT/JP2011/058911
§ 371 (c)(1),
(2), (4) Date: Jun. 28, 2012

(87) PCT Pub. No.: WO2012/137348
PCT Pub. Date: Oct. 11, 2012

(65) Prior Publication Data
US 2013/0139775 A1    Jun. 6, 2013

(51) Int. Cl.
*F02N 11/02* (2006.01)
*F02N 11/08* (2006.01)
*F02N 11/10* (2006.01)

(52) U.S. Cl.
USPC ............... 701/113; 123/179.3; 123/179.4

(58) Field of Classification Search
USPC ..................... 701/113; 123/179.3, 179.4
See application file for complete search history.

(56) References Cited

U.S. PATENT DOCUMENTS

| 8,069,832 B2* | 12/2011 | Okumoto et al. | 123/179.4 |
| 2010/0050970 A1 | 3/2010 | Okumoto et al. | |
| 2010/0326389 A1* | 12/2010 | Okumoto et al. | 123/179.4 |
| 2011/0132308 A1* | 6/2011 | Liu et al. | 123/179.4 |
| 2012/0260878 A1* | 10/2012 | Kitano et al. | 123/179.3 |
| 2012/0318227 A1* | 12/2012 | Hashimoto et al. | 123/179.3 |
| 2013/0104828 A1* | 5/2013 | Moriya et al. | 123/179.3 |
| 2013/0104830 A1* | 5/2013 | Moriya et al. | 123/179.4 |
| 2013/0118431 A1* | 5/2013 | Moriya et al. | 123/179.3 |
| 2013/0133604 A1* | 5/2013 | Gray et al. | 123/179.3 |
| 2013/0133605 A1* | 5/2013 | Neet et al. | 123/179.3 |

FOREIGN PATENT DOCUMENTS

| EP | 2 159 410 | 3/2010 |
| JP | 6 101606 | 4/1994 |
| JP | 2008 121606 | 5/2008 |

OTHER PUBLICATIONS

International Search Report issued on May 24, 2011 in PCT/JP11/058911 filed on Apr. 8, 2011.

* cited by examiner

*Primary Examiner* — Erick Solis
(74) *Attorney, Agent, or Firm* — Oblon, Spivak, McClelland, Maier & Neustadt, L.L.P.

(57) ABSTRACT

A starter includes a pinion gear that can be engaged with a ring gear coupled to a crankshaft of an engine, an actuator to move the pinion gear to a position where the pinion gear is engaged with the ring gear in a driven state, and a motor to rotate the pinion gear. When the engine is started in response to a driver's start intention, any mode of an engagement mode in which the actuator causes the pinion gear to engage with the ring gear before the motor is driven and a rotation mode in which the motor is driven before the actuator is driven is selected. When the engine is started not in response to a driver's start intention, the engagement mode is selected.

8 Claims, 5 Drawing Sheets

DEVICE AND METHOD FOR CONTROLLING STARTER, AND VEHICLE

TECHNICAL FIELD

The present invention relates to a device and a method for controlling a starter, as well as a vehicle, and particularly to technique for restricting cranking of an engine.

BACKGROUND ART

In order to improve fuel efficiency or reduce exhaust emission, some cars having an internal combustion engine such as an engine include what is called an idling-stop (or economy running) function, in which an engine is automatically stopped while a vehicle stops and a driver operates a brake pedal, and the vehicle is automatically re-started, for example, by a driver's operation to start moving again such as decrease in an amount of operation of a brake pedal to zero.

In this idling-stop, the engine may be re-started while an engine speed is relatively high. In such a case, with a conventional starter in which pushing-out of a pinion gear to rotate the engine and rotation of the pinion gear are caused by one drive command, the starter is driven after waiting until the engine speed sufficiently lowers, in order to facilitate engagement between the pinion gear and a ring gear of the engine. Then, a time lag is caused between issuance of a request to re-start an engine and actual engine cranking, and the driver may feel uncomfortable.

EP 2159410 A (PTL 1) discloses, in order to solve such a problem, a technique for causing, with the use of a starter configured such that a pinion gear engagement operation and a pinion gear rotational operation can independently be performed, a pinion gear to perform a rotational operation prior to the pinion gear engagement operation when a re-start request is issued while rotation of an engine is being lowered.

CITATION LIST

Patent Literature

PTL 1: EP 2159410 A

SUMMARY OF INVENTION

Technical Problem

When the pinion gear and the ring gear are engaged with each other while the speed of the engine is being lowered, however, the pinion gear and the ring gear may collide with each other while a rotation speed of the pinion gear does not completely match a rotation speed of the ring gear. Therefore, generation of loud sound is likely when the pinion gear and the ring gear are engaged with each other. Further, the pinion gear wears soon.

An object of the present invention is to make sound that could be generated when an engine is cranked less loud and to reduce an amount of wear of a gear.

Solution to Problem

In one embodiment, a starter includes a second gear that can be engaged with a first gear coupled to a crankshaft of an engine, an actuator to move the second gear to a position where the second gear is engaged with the first gear in a driven state, and a motor to rotate the second gear. A control device for a starter is capable of individually driving each of the actuator and the motor. The control device includes an engagement mode in which the second gear is engaged with the first gear by the actuator before the motor is driven and a rotation mode in which the motor is driven before the actuator is driven. The control device selects any one of the engagement mode and the rotation mode when the engine is started in response to a driver's start intention. The control device selects the engagement mode when the engine is started not in response to a driver's start intention.

According to this embodiment, when the engine is started not in response to the driver's start intention, the engagement mode is selected. Consequently, when the engine is started not in response to the driver's start intention, the rotation mode is not selected. Thus, frequency at which the second gear as rotating is engaged with the first gear is reduced. Therefore, sound that could be generated by collision between the second gear and the first gear can be made less loud and an amount of wear of the gear can be reduced.

In another embodiment, a speed of the engine at which the rotation mode is executed is higher than a speed of the engine at which the engagement mode is executed.

According to this embodiment, when the engine is started not in response to the driver's start intention, the first gear and the second gear are engaged with each other while a rotation speed of the first gear is low. Thus, sound that could be generated by collision between the second gear and the first gear can further be made less loud and an amount of wear of the gear can further be reduced.

In yet another embodiment, when start of the engine is requested not in response to the driver's start intention at the speed of the engine at which the rotation mode is executed, the control device waits until a speed of the engine is lowered to the speed of the engine at which the engagement mode is executed, and when a speed of the engine is lowered to the speed of the engine at which the engagement mode is executed, the control device selects the engagement mode.

According to this embodiment, when the engine is started not in response to the driver's start intention, engagement between the first gear and the second gear is restricted until a rotation speed of the first gear is lowered.

In yet another embodiment, on the premise that a speed of the engine has lowered to the speed of the engine at which the engagement mode is executed, an engine start request condition not in response to the driver's start intention is satisfied.

According to this embodiment, when the engine is started not in response to the driver's start intention, engagement between the first gear and the second gear while a rotation speed of the first gear is high is prevented.

In yet another embodiment, start of the engine in response to the driver's start intention includes at least any one of start of the engine in response to an operation of a clutch pedal, start of the engine in response to a shift operation, start of the engine in response to decrease in amount of operation of a brake pedal, start of the engine in response to increase in amount of operation of an accelerator pedal, start of the engine in response to a rate of increase in amount of operation of the accelerator pedal being equal to or greater than a prescribed value, and start of the engine in response to selection of a sport mode.

According to this embodiment, in at least any one of a case where the engine is started in response to the operation of the clutch pedal, a case where the engine is started in response to the shift operation, a case where the engine is started in response to decrease in amount of operation of the brake pedal, a case where the engine is started in response to increase in amount of operation of the accelerator pedal, a case where the engine is started in response to the fact that the
} rate of increase in amount of operation of the accelerator pedal is equal to or greater than the prescribed value, and a case where the engine is started in response to selection of the sport mode, the second gear can be engaged with the first gear while it is rotating. Therefore, the first gear and the second gear can be in synchronization with each other before a rotation speed of the first gear is lowered to around zero so that the first gear and the second gear can be engaged with each other. Consequently, the engine can quickly be started.

In yet another embodiment, start of the engine not in response to the driver's start intention includes at least any one of start of the engine in response to decrease in negative air pressure, start of the engine in response to lowering in voltage of a battery, start of the engine in response to an air-conditioning apparatus, start of the engine in response to restriction of stop of the engine, start of the engine in response to an operation of a steering wheel, start of the engine in response to opening of a door, and start of the engine in response to turn-on of a hazard light.

According to this embodiment, when the engine is started not in response to the driver's start intention in at least any one of a case where the engine is started in response to decrease in negative air pressure, a case where the engine is started in response to lowering in voltage of the battery, a case where the engine is started in response to the air-conditioning apparatus, a case where the engine is started in response to restriction of stop of the engine, a case where the engine is started in response to the operation of the steering wheel, a case where the engine is started in response to opening of the door, and the engine is started in response to turn-on of the hazard light, the rotation mode is not selected. Thus, frequency at which the second gear as rotating is engaged with the first gear is reduced. Therefore, sound that could be generated by collision between the second gear and the first gear can be made less loud and an amount of wear of the gear can be reduced.

Advantageous Effects of Invention

When the engine is started not in response to the driver's start intention, the engagement mode is selected. Consequently, when the engine is started not in response to the driver's start intention, the rotation mode is not selected. Thus, frequency at which the second gear as rotating is engaged with the first gear is reduced. Therefore, sound that could be generated by collision between the second gear and the first gear can be made less loud and an amount of wear of the gear can be reduced.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

Figure 1:
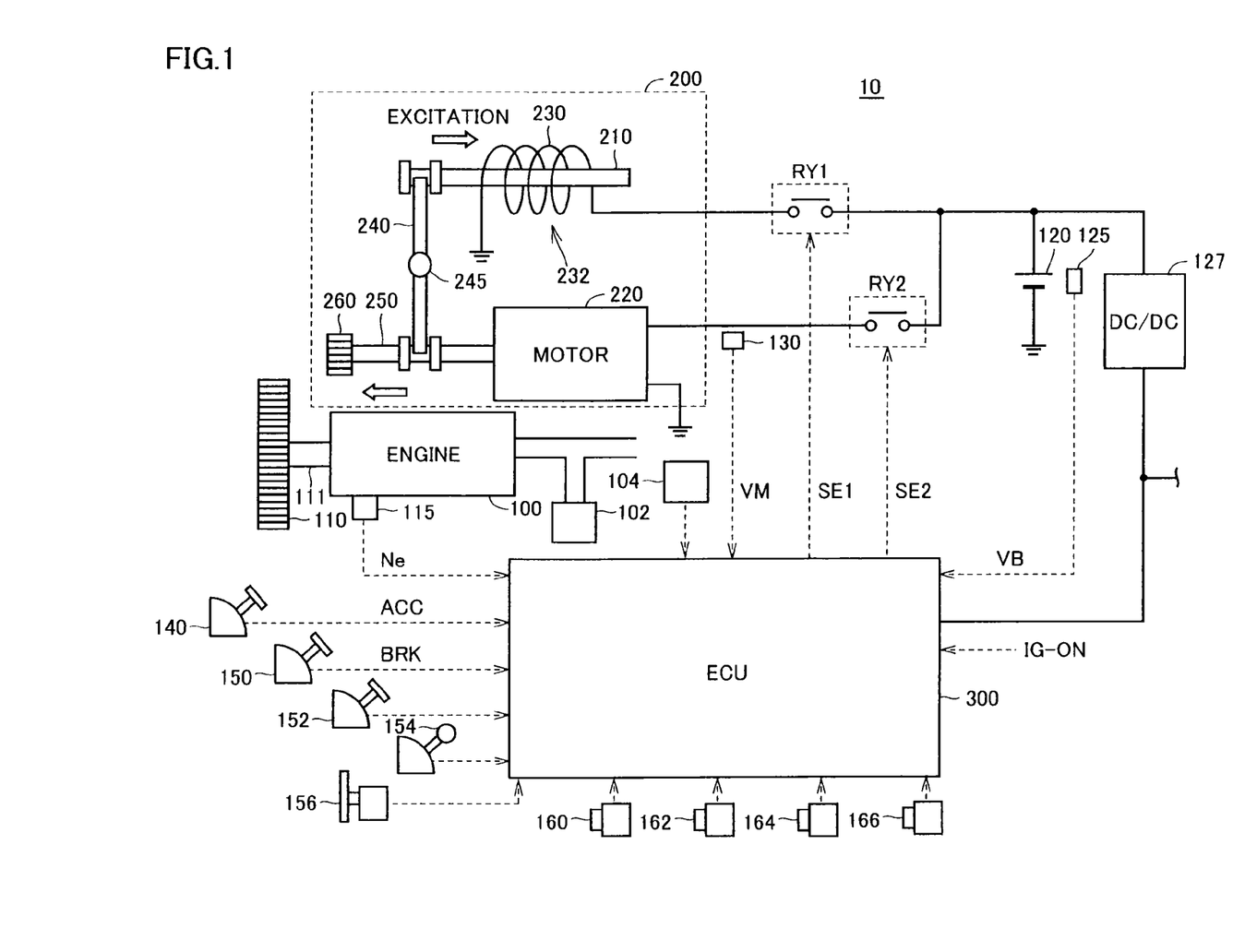
FIG. 1 is an overall block diagram of a vehicle.

FIG. 1 is an overall block diagram of a vehicle 10. Referring to FIG. 1, vehicle 10 includes an engine 100, a negative air pressure tank 102, a battery 120, a starter 200, an ECU 300, and relays RY1, RY2. Starter 200 includes a plunger 210, a motor 220, a solenoid 230, a coupling portion 240, an output member 250, and a pinion gear 260.

Engine 100 generates driving force for running vehicle 10. A crankshaft 111 of engine 100 is connected to a drive wheel, with a powertrain structured to include a clutch, a reduction gear, or the like being interposed.

Engine 100 is provided with a rotation speed sensor 115. Rotation speed sensor 115 detects a speed Ne of engine 100 and outputs a detection result to ECU 300.

Negative air pressure tank 102 stores a negative air pressure generated as engine 100 operates. Negative air pressure tank 102 is coupled, for example, to an intake manifold.

Battery 120 is an electric power storage element configured such that it can be charged and can discharge. Battery 120 is configured to include a secondary battery such as a lithium ion battery, a nickel metal hydride battery, a lead-acid battery, or the like. Alternatively, battery 120 may be implemented by a power storage element such as an electric double layer capacitor.

Battery 120 is connected to starter 200 with relays RY1, RY2 controlled by ECU 300 being interposed. Battery 120 supplies a supply voltage for driving to starter 200 as relays RY1, RY2 are closed. It is noted that a negative electrode of battery 120 is connected to a body earth of vehicle 10.

Battery 120 is provided with a voltage sensor 125. Voltage sensor 125 detects an output voltage VB of battery 120 and outputs a detection value to ECU 300.

A voltage of battery 120 is supplied to ECU 300 and such auxiliary machinery as an inverter of an air-conditioning apparatus through a DC/DC converter 127.

Relay RY1 has one end connected to a positive electrode of battery 120 and the other end connected to one end of solenoid 230 within starter 200. Relay RY1 is controlled by a control signal SE1 from ECU 300 so as to switch between supply and cut-off of a supply voltage from battery 120 to solenoid 230.

Relay RY2 has one end connected to the positive electrode of battery 120 and the other end connected to motor 220 within starter 200. Relay RY2 is controlled by a control signal SE2 from ECU 300 so as to switch between supply and cut-off of a supply voltage from battery 120 to motor 220. In addition, a voltage sensor 130 is provided in a power line connecting relay RY2 and motor 220 to each other. Voltage sensor 130 detects a motor voltage VM and outputs a detection value to ECU 300.

As described above, supply of a supply voltage to motor 220 and solenoid 230 within starter 200 can independently be controlled by relays RY1, RY2.

Output member 250 is coupled to a rotation shaft of a rotor (not shown) within the motor, for example, by a straight spline or the like. In addition, pinion gear 260 is provided on an end portion of output member 250 opposite to motor 220. As relay RY2 is closed, the supply voltage is supplied from battery 120 so as to rotate motor 220. Then, output member 250 transmits the rotational operation of the rotor to pinion gear 260, to thereby rotate pinion gear 260.

As described above, solenoid 230 has one end connected to relay RY1 and the other end connected to the body earth. As relay RY1 is closed and solenoid 230 is excited, solenoid 230 attracts plunger 210 in a direction of an arrow. Namely, plunger 210 and solenoid 230 constitute an actuator 232.

Plunger 210 is coupled to output member 250 with coupling portion 240 being interposed. As solenoid 230 is excited, plunger 210 is attracted in the direction of the arrow. Thus, coupling portion 240 of which fulcrum 245 is fixed moves output member 250 from a stand-by position shown in FIG. 1 in a direction reverse to a direction of operation of plunger 210, that is, a direction in which pinion gear 260 moves away from a main body of motor 220. In addition, biasing force reverse to the arrow in FIG. 1 is applied to plunger 210 by a not-shown spring mechanism, and when solenoid 230 is no longer excited, it returns to the stand-by position.

As output member 250 thus operates in an axial direction as a result of excitation of solenoid 230, pinion gear 260 is engaged with ring gear 110 provided around an outer circumference of a flywheel or a drive plate attached to crankshaft 111 of engine 100. Then, as pinion gear 260 performs a rotational operation while pinion gear 260 and ring gear 110 are engaged with each other, engine 100 is cranked and started.

Thus, in the present embodiment, actuator 232 to move pinion gear 260 so as to be engaged with ring gear 110 provided around the outer circumference of the flywheel or the drive plate of engine 100 and motor 220 to rotate pinion gear 260 are individually controlled.

Though not shown in FIG. 1, a one-way clutch may be provided between output member 250 and a rotor shaft of motor 220 such that the rotor of motor 220 does not rotate due to the rotational operation of ring gear 110.

In addition, actuator 232 in FIG. 1 is not limited to the mechanism as above so long as it is a mechanism capable of transmitting rotation of pinion gear 260 to ring gear 110 and switching between a state that pinion gear 260 and ring gear 110 are engaged with each other and a state that they are not engaged with each other. For example, such a mechanism that pinion gear 260 and ring gear 110 are engaged with each other as a result of movement of the shaft of output member 250 in a radial direction of pinion gear 260 is also applicable.

ECU 300 includes a CPU (Central Processing Unit), a storage device, and an input/output buffer, none of which is shown, and receives input from each sensor or provides output of a control command to each piece of equipment. It is noted that control of these components is not limited to processing by software, and a part thereof may also be constructed by dedicated hardware (electronic circuitry) and processed.

ECU 300 receives a signal ACC indicating an amount of operation of an accelerator pedal 140 from a sensor (not shown) provided on accelerator pedal 140. ECU 300 receives a signal BRK indicating an amount of operation of a brake pedal 150 from a sensor (not shown) provided on brake pedal 150. In addition, ECU 300 receives a start operation signal IG-ON issued in response to a driver's ignition operation or the like. Moreover, ECU 300 receives a signal indicating an amount of operation of a clutch pedal 152 from a sensor (not shown) provided on clutch pedal 152. Further, ECU 300 receives a signal indicating a position of a shift lever 154 from a sensor (not shown) provided on shift lever 154. Furthermore, ECU 300 receives a signal indicating a running mode selected through a switch 160 for selecting a running mode of the vehicle (such as a sport mode (also referred to as a power mode), a normal mode, or an eco mode). In addition, ECU 300 receives a signal indicating a detection value from a sensor (not shown) for detecting a negative air pressure stored in negative air pressure tank 102. Moreover, ECU 300 receives a signal indicating output voltage VB of battery 120 from voltage sensor 125. Further, ECU 300 receives a signal indicating actuation of an air-conditioning apparatus 104, for example, through an ECU for controlling air-conditioning apparatus 104. Furthermore, ECU 300 receives a signal indicating prohibition or permission of idling step from a switch 162 operated by the driver in order to prohibit or permit idling step. In addition, ECU 300 receives a signal indicating a steering angle from a sensor (not shown) for detecting an angle of a steering wheel 156. Moreover, ECU 300 receives a signal indicating opening or closing of a door from a switch 164 for detecting an opened and closed state of the door. Further, ECU 300 receives a signal indicating turn-on of a hazard light from a switch 166 operated by the driver in order to flash the hazard light.

Based on such information, ECU 300 generates a signal requesting start of engine 100 and a signal requesting stop thereof and outputs control signal SE1, SE2 in accordance therewith, so as to control an operation of starter 200.

For example, when the vehicle stops and such a stop condition that the driver operates brake pedal 150 and stop of engine 100 is not restricted (permitted) is satisfied, a signal requesting stop is generated and ECU 300 causes engine 100 to stop. Namely, when the stop condition is satisfied, injection and combustion of fuel in engine 100 are stopped.

Thereafter, when such a start condition that an amount of operation of brake pedal 150 by the driver is zero is satisfied, a signal requesting start is generated and ECU 300 drives motor 220 and cranks engine 100. Cranking of engine 100 may be started without generation of a signal requesting start. Engine 100 may otherwise be cranked when accelerator pedal 140, shift lever 152 for selecting a shift range or a gear, or switch 160 for selecting a running mode of the vehicle (such as the sport mode (also referred to as the power mode), the normal mode, or the eco mode) is operated.

When a condition for starting engine 100 is satisfied, ECU 300 controls actuator 232 and motor 220 in any one mode of an engagement mode in which actuator 232 and motor 220 are controlled such that pinion gear 260 starts rotation after pinion gear 260 moved toward ring gear 110 and a rotation mode in which actuator 232 and motor 220 are controlled such that pinion gear 260 moves toward ring gear 110 after pinion gear 260 started rotation.

When engine speed Ne is equal to or lower than a predetermined first reference value $\alpha 1$, ECU 300 controls actuator 232 and motor 220 in the engagement mode. On the other hand, when engine speed Ne is higher than first reference value $\alpha 1$, ECU 300 controls actuator 232 and motor 220 in the rotation mode. More specifically, when engine speed Ne is greater than first reference value $\alpha 1$ and a start condition based on the driver's start intention is satisfied, actuator 232 and motor 220 are controlled in the rotation mode.

When engine speed Ne is greater than first reference value $\alpha 1$ and a start condition different from the start condition based on the driver's start intention is satisfied, however, after engine speed Ne has lowered to first reference value $\alpha 1$ or lower, actuator 232 and motor 220 are controlled in the engagement mode.

Figure 2:
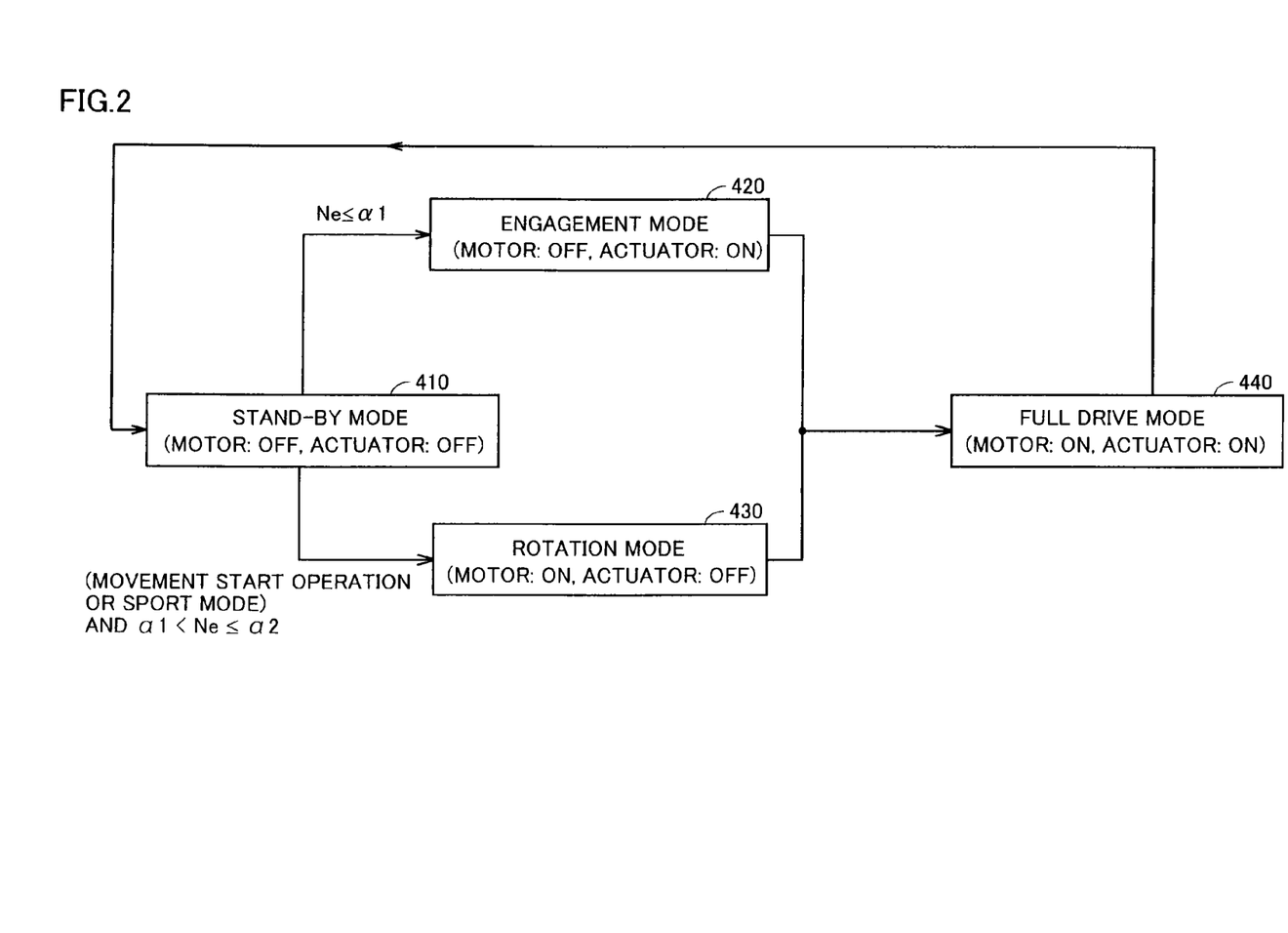
FIG. 2 is a diagram for illustrating transition of an operation mode of a starter.

FIG. 2 is a diagram for illustrating transition of an operation mode of starter 200 in the present embodiment. The operation mode of starter 200 in the present embodiment includes a stand-by mode 410, an engagement mode 420, a rotation mode 430, and a full drive mode 440.

The engagement mode described previously is a mode in which transition to full drive mode 440 is made via engagement mode 420. The rotation mode is a mode in which transition to full drive mode 440 is made via rotation mode 430.

Stand-by mode 410 represents such a state that neither of actuator 232 and motor 220 in starter 200 is driven, that is, a state that an engine start request to starter 200 is not output. Stand-by mode 410 corresponds to the initial state of starter 200, and it is selected when drive of starter 200 is not necessary, for example, before an operation to start engine 100, after completion of start of engine 100, failure in starting engine 100, and the like.

Full drive mode 440 represents such a state that both of actuator 232 and motor 220 in starter 200 are driven. In this full drive mode 440, motor 220 rotates pinion gear 260 while pinion gear 260 and ring gear 110 are engaged with each other. Thus, engine 100 is actually cranked and the operation for start is started.

As described above, starter 200 in the present embodiment can independently drive each of actuator 232 and motor 220. Therefore, in a process of transition from stand-by mode 410 to full drive mode 440, there are a case where actuator 232 is driven prior to drive of motor 220 (that is, corresponding to engagement mode 420) and a case where motor 220 is driven prior to drive of actuator 232 (that is, corresponding to rotation mode 430).

Selection between engagement mode 420 and rotation mode 430 is made based on a type of a start condition satisfied and engine speed Ne when the start condition is satisfied (when re-start of engine 100 is requested).

Engagement mode 420 refers to a state where only actuator 232 is driven and motor 220 is not driven. This mode is selected when pinion gear 260 and ring gear 110 can be engaged with each other even while pinion gear 260 remains stopped. Specifically, while engine 100 remains stopped or while speed Ne of engine 100 is sufficiently low (Ne≤first reference value $\alpha 1$), this engagement mode 420 is selected.

Meanwhile, rotation mode 430 refers to a state where only motor 220 is driven and actuator 232 is not driven. Rotation mode 430 is selected, for example, when a request for re-start of engine 100 is output when speed Ne of engine 100 is relatively high ($\alpha 1 < Ne \le$ a second reference value $\alpha 2$) and when a request for re-start engine 100 is output in response to the fact that a start condition based on the driver's start intention is satisfied.

A start condition based on the driver's start intention includes, for example, such a condition that an operation to start moving the vehicle has been performed by the driver. Therefore, when speed Ne of engine 100 is high ($\alpha 1 < Ne \le \alpha 2$) and when a request for re-start of engine 100 is output in response to the driver's operation to start moving the vehicle, rotation mode 430 is selected.

In rotation mode 430, only motor 220 is driven prior to drive of actuator 232, so that a rotation speed of ring gear 110 and a rotation speed of pinion gear 260 are in synchronization with each other. Then, in response to difference between the rotation speed of ring gear 110 and the rotation speed of pinion gear 260 being sufficiently small, the operation mode makes transition from rotation mode 430 to full drive mode 440. Then, actuator 232 is driven and ring gear 110 and pinion gear 260 are engaged with each other.

In the case of full drive mode 440, the operation mode returns from full drive mode 440 to stand-by mode 410 in response to completion of start of engine 100 and start of a self-sustained operation of engine 100.

Even though speed Ne of engine 100 is greater than first reference value $\alpha 1$, rotation mode 430 is not selected when a request for re-start of engine 100 is output in response to a start condition different from the driver's operation to start moving the vehicle. In this case, engagement mode 420 is selected after speed Ne of engine 100 is lowered to first reference value $\alpha 1$ or lower. Namely, cranking of engine 100 by motor 220 is restricted until speed Ne of engine 100 is equal to or lower than first reference value $\alpha 1$. Namely, start of cranking of engine 100 is delayed.

By way of example, start of engine 100 in response to the driver's start intention includes at least any one of "start of engine 100 in response to the operation (pressing) of clutch pedal 152," "start of engine 100 in response to the shift operation (for example, change in shift position from neutral to drive position)," "start of engine 100 in response to decrease in amount of operation of brake pedal 150," "start of engine 100 in response to increase in amount of operation (accelerator position) of accelerator pedal 140," "start of engine 100 in response to the fact that a rate of increase in accelerator position is equal to or higher than a prescribed value," and "start of engine 100 in response to selection of the sport mode." Start of engine 100 in response to the driver's start intention is not limited thereto.

Similarly, by way of example, start of engine 100 not in response to the driver's start intention includes at least any one of "start of engine 100 in response to the fact that the negative air pressure stored in negative air pressure tank 102 has lowered to a threshold value or lower," "start of engine 100 in response to the fact that a voltage of an auxiliary battery has lowered to a threshold value or lower," "start of engine 100 in response to actuation of an air-conditioning apparatus," "start of engine 100 in response to prohibition of idling stop (restriction of stop of engine 100)," "start of engine 100 in response to the operation of steering wheel 156," "start of engine 100 in response to opening of the door," and "start of engine 100 in response to turn-on of the hazard light." Start of engine 100 not in response to the driver's start intention is not limited thereto.

Thus, when a signal requesting start of engine 100 is output, that is, when it is determined that engine 100 is to be started, actuator 232 and motor 220 are controlled in any one mode of the engagement mode in which transition to full drive mode 440 is made via engagement mode 420 and the rotation mode in which transition to full drive mode 440 is made via rotation mode 430.

Figure 3:
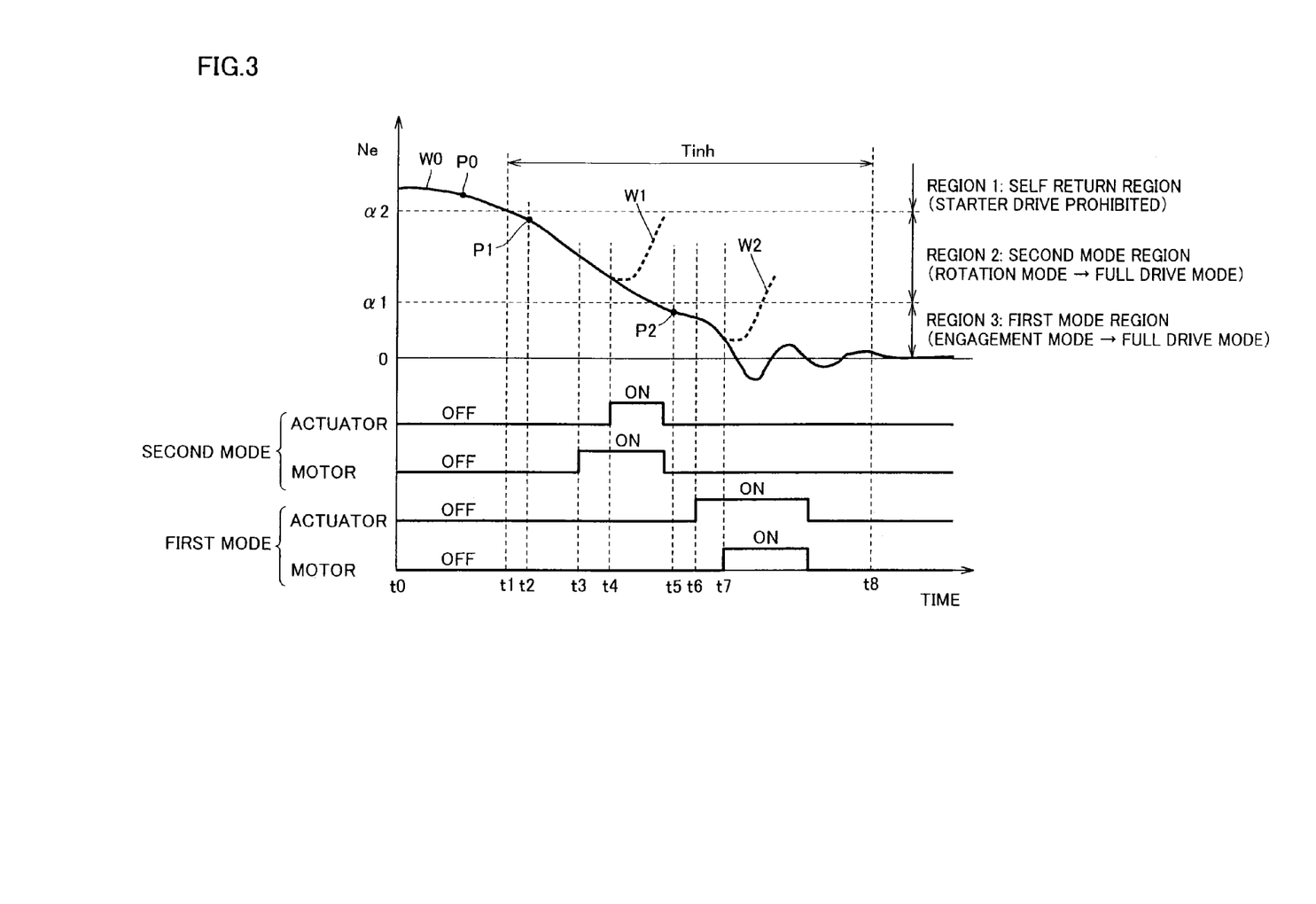
FIG. 3 is a diagram for illustrating a drive mode of the starter when a request for starting an engine is issued in response to an operation performed for starting movement of the vehicle.

FIG. 3 is a diagram for illustrating two drive modes (the engagement mode, the rotation mode) in an engine start operation in the present embodiment.

In FIG. 3, the abscissa indicates time and the ordinate indicates speed Ne of engine 100 and a state of drive of actuator 232 and motor 220 in the engagement mode and the rotation mode.

A case where, at a time t0, for example, the vehicle stops, and a stop condition that the driver operates brake pedal 150 is satisfied and consequently a request to stop engine 100 is generated and engine 100 is stopped (injection and ignition of fuel are stopped) is considered. Here, unless engine 100 is re-started, speed Ne of engine 100 gradually lowers as shown with a solid curve W0 and finally rotation of engine 100 stops.

Then, a case where, for example, such a start condition that an amount of the driver's operation of brake pedal 150 attains to zero while speed Ne of engine 100 is lowering is satisfied and thus a request to re-start engine 100 is generated is considered. Here, categorization into three regions based on speed Ne of engine 100 is made.

A first region (region 1) refers to a case where speed Ne of engine 100 is higher than second reference value $\alpha 2$, and for example, such a state that a start condition is satisfied and a request for re-start is generated at a point P0 in FIG. 3. A signal indicating a request for re-start does not have to be generated.

This region 1 is a region where engine 100 can be started by a fuel injection and ignition operation without using starter 200 because speed Ne of engine 100 is sufficiently high. Namely, region 1 is a region where engine 100 can return by itself. Therefore, in region 1, drive of starter 200 is restricted, more specifically, prohibited. It is noted that second reference value α2 described above may be restricted depending on a maximum speed of motor 220.

A second region (region 2) refers to a case where speed Ne of engine 100 is located between first reference value α1 and second reference value α2, and such a state that a start condition is satisfied at a point P1 in FIG. 3.

This region 2 is a region where speed Ne of engine 100 is relatively high, although engine 100 cannot return by itself. In this region, the rotation mode is selected as described with reference to FIG. 2.

When a start condition is satisfied at a time t2, initially, motor 220 is driven after lapse of a prescribed time period. Thus, pinion gear 260 starts to rotate. Then, at a time t4, actuator 232 is driven. When ring gear 110 and pinion gear 260 are engaged with each other, engine 100 is cranked and speed Ne of engine 100 increases as shown with a dashed curve W1. Thereafter, when engine 100 resumes the self-sustained operation, drive of actuator 232 and motor 220 is stopped.

A third region (region 3) refers to a case where speed Ne of engine 100 is lower than first reference value α1, and for example, such a state that a start condition is satisfied at a point P2 in FIG. 3.

This region 3 is a region where speed Ne of engine 100 is low and pinion gear 260 and ring gear 110 can be engaged with each other without synchronizing pinion gear 260. In this region, the engagement mode is selected as described with reference to FIG. 2.

When a start condition is satisfied at a time t5, initially, actuator 232 is driven after lapse of a prescribed time period. Thus, pinion gear 260 is pushed toward ring gear 110. Thereafter, motor 220 is driven (a time t7 in FIG. 3). Thus, engine 100 is cranked and speed Ne of engine 100 increases as shown with a dashed curve W2. Thereafter, when engine 100 resumes the self-sustained operation, drive of actuator 232 and motor 220 is stopped.

By thus controlling re-start of engine 100 by using starter 200 in which actuator 232 and motor 220 can independently be driven, engine 100 can be re-started in a shorter period of time than in a case of a conventional starter where an operation to re-start engine 100 was prohibited during a period (Tinh) from a speed at which return of engine 100 by itself was impossible (a time t1 in FIG. 3) to stop of engine 100 (a time t8 in FIG. 3). Thus, the driver's uncomfortable feeling due to delayed re-start of the engine can be lessened.

Figure 4:
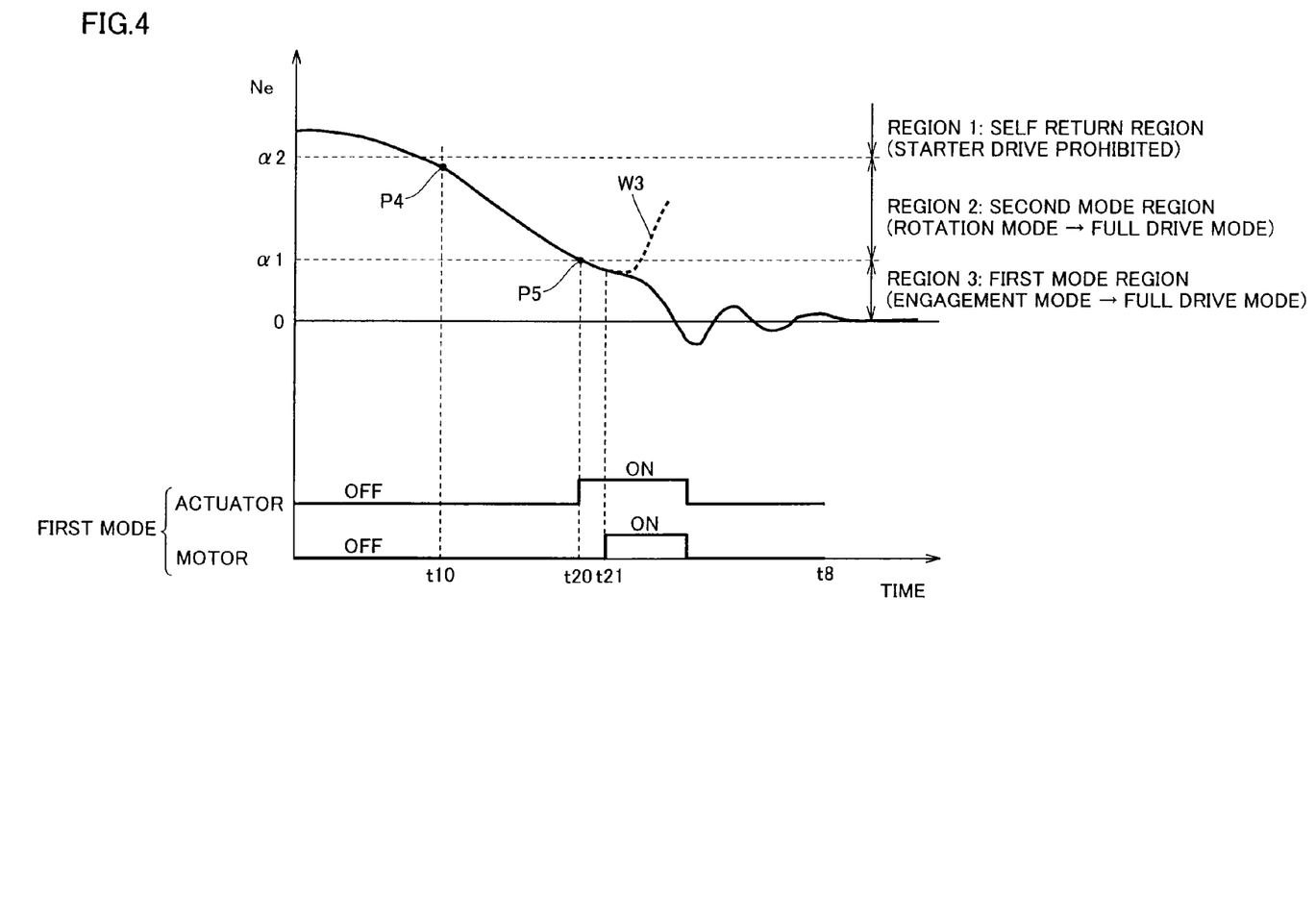
FIG. 4 is a diagram for illustrating a drive mode of the starter when a request for starting the engine is issued in response to lowering in negative air pressure.

Referring to FIG. 4, a case where, for example, such a start condition that a negative air pressure stored in negative air pressure tank 102 has lowered to a threshold value or lower while speed Ne of engine 100 is lowering is satisfied and thus engine 100 is re-started not in response to the driver's start intention is considered.

Since a manner of operation of starter 200 in a case where a request for re-start is generated in region 1 and region 3 described above is the same as a manner of operation in a case where a request for re-starting engine 100 is generated in response to the fact that such a start condition as an amount of the driver's operation of brake pedal 150 being zero is satisfied, detailed description thereof will not be repeated here.

In a state where such a start condition that the negative air pressure stored in negative air pressure tank 102 has lowered to the threshold value or lower is satisfied at a point P4 in FIG. 4, speed Ne of engine 100 is intermediate between first reference value α1 and second reference value α2. The rotation mode, however, is not selected but selection of the stand-by mode is continued. Consequently, engine speed Ne continues to lower.

When engine speed Ne has lowered to first reference value α1 at a time t20, the engagement mode is selected as described with reference to FIG. 2. Consequently, actuator 232 is initially driven. Thus, pinion gear 260 is pushed toward ring gear 110. Thereafter, motor 220 is driven (a time t21 in FIG. 4). Thus, engine 100 is cranked and speed Ne of engine 100 increases as shown with a dashed curve W3. Thereafter, when engine 100 resumes the self-sustained operation, drive of actuator 232 and motor 220 is stopped.

Thus, on the premise that speed Ne of engine 100 has lowered to the speed of engine 100 at which the engagement mode is executed, an engine 100 start request condition not in response to the driver's start intention is satisfied. ECU 300 may generate and output a request for re-start at a point P5 in FIG. 4 at which speed Ne of engine 100 has lowered to the speed of engine 100 at which the engagement mode is executed.

Figure 5:
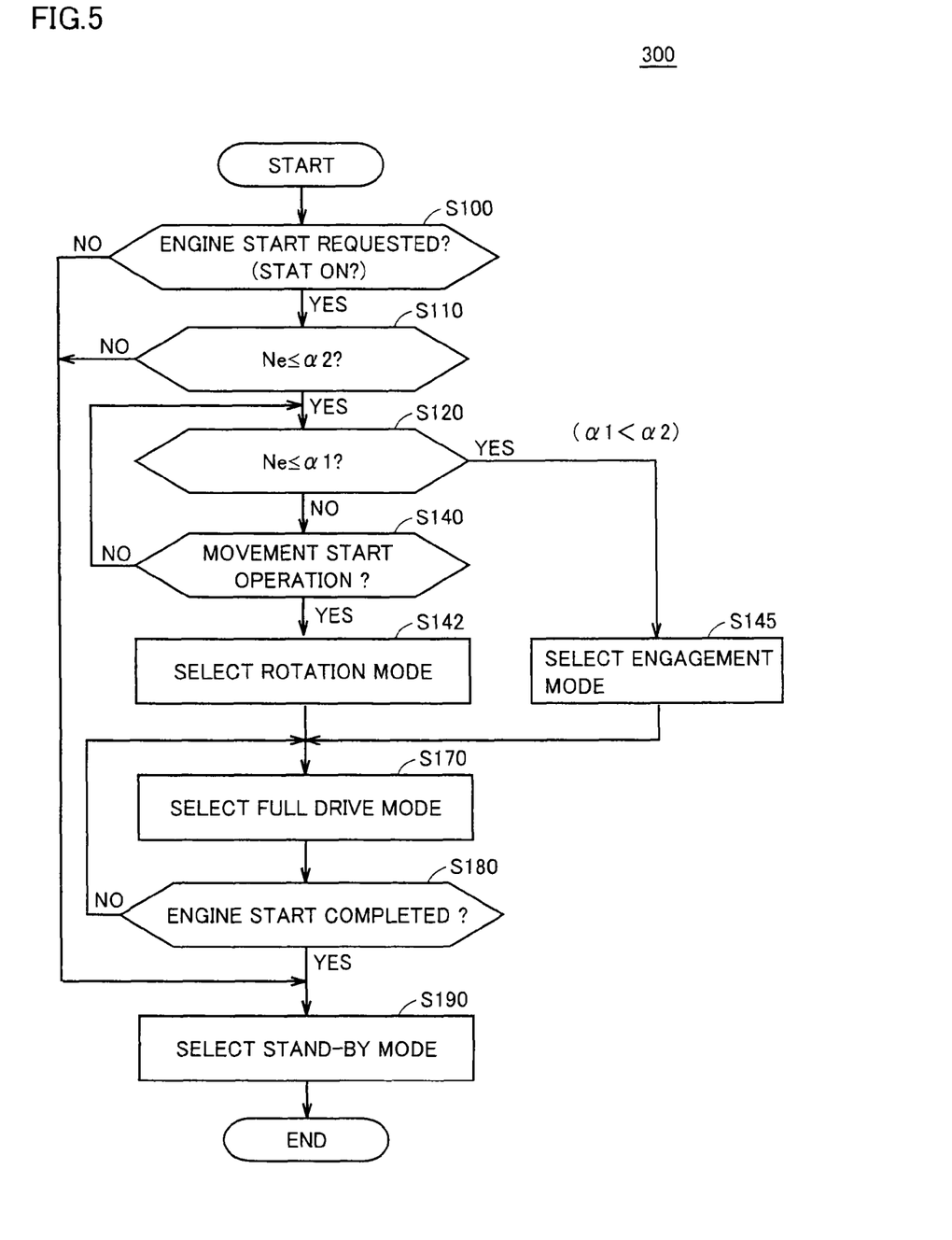
FIG. 5 is a flowchart showing processing performed by an ECU.

Processing performed by ECU 300 for starting engine 100 will be described below with reference to FIG. 5. The flowchart shown in FIG. 5 is realized by executing a program stored in advance in ECU 300 in a prescribed cycle. Alternatively, regarding some steps, processing can also be performed by constructing dedicated hardware (electronic circuitry).

In step (hereinafter the step being abbreviated as S) 100, ECU 300 determines whether start of engine 100 has been requested or not. That is, whether to start engine 100 or not is determined.

When start of engine 100 has not been requested (NO in S100), ECU 300 causes the process to proceed to S190 and selects the stand-by mode because an operation to start engine 100 is not necessary.

When start of engine 100 has been requested (YES in S100), the process proceeds to S110 and ECU 300 then determines whether or not speed Ne of engine 100 is equal to or lower than second reference value α2.

When speed Ne of engine 100 is higher than second reference value α2 (NO in S110), this case corresponds to region 1 in FIG. 3 where engine 100 can return by itself. Therefore, ECU 300 causes the process to proceed to S190 and selects the stand-by mode.

When speed Ne of engine 100 is equal to or lower than second reference value α2 (YES in S110), ECU 300 further determines whether or not speed Ne of engine 100 is equal to or lower than first reference value α1.

When speed Ne of engine 100 is equal to or lower than first reference value α1 (YES in S120), this case corresponds to region 1 in FIG. 3. Therefore, the process proceeds to S145 and ECU 300 selects the engagement mode. Then, ECU 300 outputs control signal SE1 so as to close relay RY1, and thus actuator 232 is driven. Here, motor 220 is not driven.

Thereafter, the process proceeds to S170 and ECU 300 selects the full drive mode. Then, starter 200 starts cranking of engine 100.

Then, in S180, ECU 300 determines whether start of engine 100 has been completed or not. Determination of completion of start of engine 100 may be made, for example, based on whether or not the engine speed is higher than a threshold value γ indicating the self-sustained operation after lapse of a prescribed period of time since start of drive of motor 220.

When start of engine 100 has not been completed (NO in S180), the process returns to S170 and cranking of engine 100 is continued.

When start of engine 100 has been completed (YES in S180), the process proceeds to S190 and ECU 300 selects the stand-by mode.

When speed Ne of engine 100 is higher than first reference value α1 (NO in S120), the process proceeds to S140 and ECU 300 determines whether the request for start is issued in response to a driver's intention (operation) to start moving the vehicle or not.

When the request for start is issued in response to the driver's intention (operation) to start moving the vehicle (YES in S140), ECU 300 selects the rotation mode in S142. Then, ECU 300 outputs control signal SE2 so as to close relay RY2, and thus motor 220 is driven. Here, actuator 232 is not driven.

Then, ECU 300 selects the full drive mode in S170. Thus, actuator 232 is driven, pinion gear 260 and ring gear 110 are engaged with each other, and engine 100 is cranked.

On the other hand, when the request for start is issued not in response to the driver's operation to start moving the vehicle (NO in S140), the process returns to S120.

When speed Ne of engine 100 has lowered to first reference value α1 or lower (YES in S120), the process proceeds to S145 and ECU 300 selects the engagement mode. Then, ECU 300 outputs control signal SE1 so as to close relay RY1, and thus actuator 232 is driven.

Thereafter, the process proceeds to S170 and ECU 300 selects the full drive mode. Then, starter 200 starts cranking of engine 100. When start of engine 100 has been completed (YES in S180), the process proceeds to S190 and ECU 300 selects the stand-by mode.

As described above, in the present embodiment, when the engine is started not in response to a driver's start intention, the engagement mode is selected. Consequently, when engine 100 is started not in response to the driver's start intention, the rotation mode is not selected. Thus, frequency at which pinion gear 260 as rotating is engaged with ring gear 110 is reduced. Therefore, sound that could be generated by collision between pinion gear 260 and ring gear 110 can be made less loud and an amount of wear of the gear can be reduced.

Reference Signs List 10 vehicle; 100 engine; 102 negative air pressure tank; 110 ring gear; 111 crankshaft; 115 rotation speed sensor; 120 battery; 140 accelerator pedal; 150 brake pedal; 152 clutch pedal; 154 shift lever; 156 steering wheel; 160, 162, 164, 166 switch; 200 starter; 210 plunger; 220 motor; 230 solenoid; 232 actuator; 240 coupling portion; 245 fulcrum; 250 output member; 260 pinion gear; 300 ECU; 410 stand-by mode; 420 engagement mode; 430 rotation mode; 440 full drive mode; and RY1, RY2 relay.

The invention claimed is:

1. A control device for a starter including a second gear that can be engaged with a first gear coupled to a crankshaft of an engine, an actuator to move said second gear to a position where said second gear is engaged with said first gear in a driven state, and a motor to rotate said second gear, said control device being capable of individually driving each of said actuator (232) and said motor, comprising:
   an engagement mode in which said second gear is engaged with said first gear by said actuator before said motor is driven; and
   a rotation mode in which said motor is driven before said actuator is driven, wherein
   said control device selects any one of said engagement mode and said rotation mode when said engine is started in response to a driver's start intention, and selects said engagement mode when said engine is started not in response to a driver's start intention.

2. The control device for a starter according to claim 1, wherein
   a speed of said engine at which said rotation mode is executed is higher than a speed of said engine at which said engagement mode is executed.

3. The control device for a starter according to claim 2, wherein
   when start of said engine is requested not in response to said driver's start intention at the speed of said engine at which said rotation mode is executed, said control device waits until a speed of said engine is lowered to the speed of said engine at which said engagement mode is executed, and when a speed of said engine is lowered to the speed of said engine at which said engagement mode is executed, said control device selects said engagement mode.

4. The control device for a starter according to claim 2, wherein
   on the premise that a speed of said engine has lowered to the speed of said engine at which said engagement mode is executed, an engine start request condition not in response to said driver's start intention is satisfied.

5. The control device for a starter according to claim 1, wherein
   start of said engine in response to the driver's start intention includes at least any one of start of said engine in response to an operation of a clutch pedal, start of said engine in response to a shift operation, start of said engine in response to decrease in amount of operation of a brake pedal, start of said engine in response to increase in amount of operation of an accelerator pedal, start of said engine in response to a rate of increase in amount of operation of the accelerator pedal being equal to or greater than a prescribed value, and start of said engine in response to selection of a sport mode.

6. The control device for a starter according to claim 1, wherein
   start of said engine not in response to the driver's start intention includes at least any one of start of said engine in response to decrease in negative air pressure, start of said engine in response to lowering in voltage of a battery, start of said engine in response to an air-conditioning apparatus, start of said engine in response to restriction of stop of said engine, start of said engine in response to an operation of a steering wheel, start of said engine in response to opening of a door, and start of said engine in response to turn-on of a hazard light.

7. A method for controlling a starter including a second gear that can be engaged with a first gear coupled to a crankshaft of an engine, an actuator to move said second gear to a position where said second gear is engaged with said first gear in a driven state, and a motor to rotate said second gear, each of said actuator and said motor being able to individually be driven, said actuator and said motor being controlled in any one mode of an engagement mode in which said second gear is engaged with said first gear by said actuator before said motor is driven and a rotation mode in which said motor is driven before said actuator is driven, comprising the steps of:
   selecting any one of said engagement mode and said rotation mode when said engine is started in response to a driver's start intention; and
   selecting said engagement mode when said engine is started not in response to a driver's start intention.

8. A vehicle, comprising:

an engine;

a starter including a second gear that can be engaged with a first gear coupled to a crankshaft of said engine, an actuator to move said second gear to a position where said second gear is engaged with said first gear in a driven state, and a motor to rotate said second gear; and a control unit being capable of individually driving each of said actuator and said motor, wherein said control unit includes an engagement mode in which said second gear is engaged with said first gear by said actuator before said motor is driven and a rotation mode in which said motor is driven before said actuator is driven, and said control unit selects any one of said engagement mode and said rotation mode when said engine is started in response to a driver's start intention, and selects said engagement mode when said engine is started not in response to a driver's start intention.

* * * * *